Patented Nov. 3, 1936

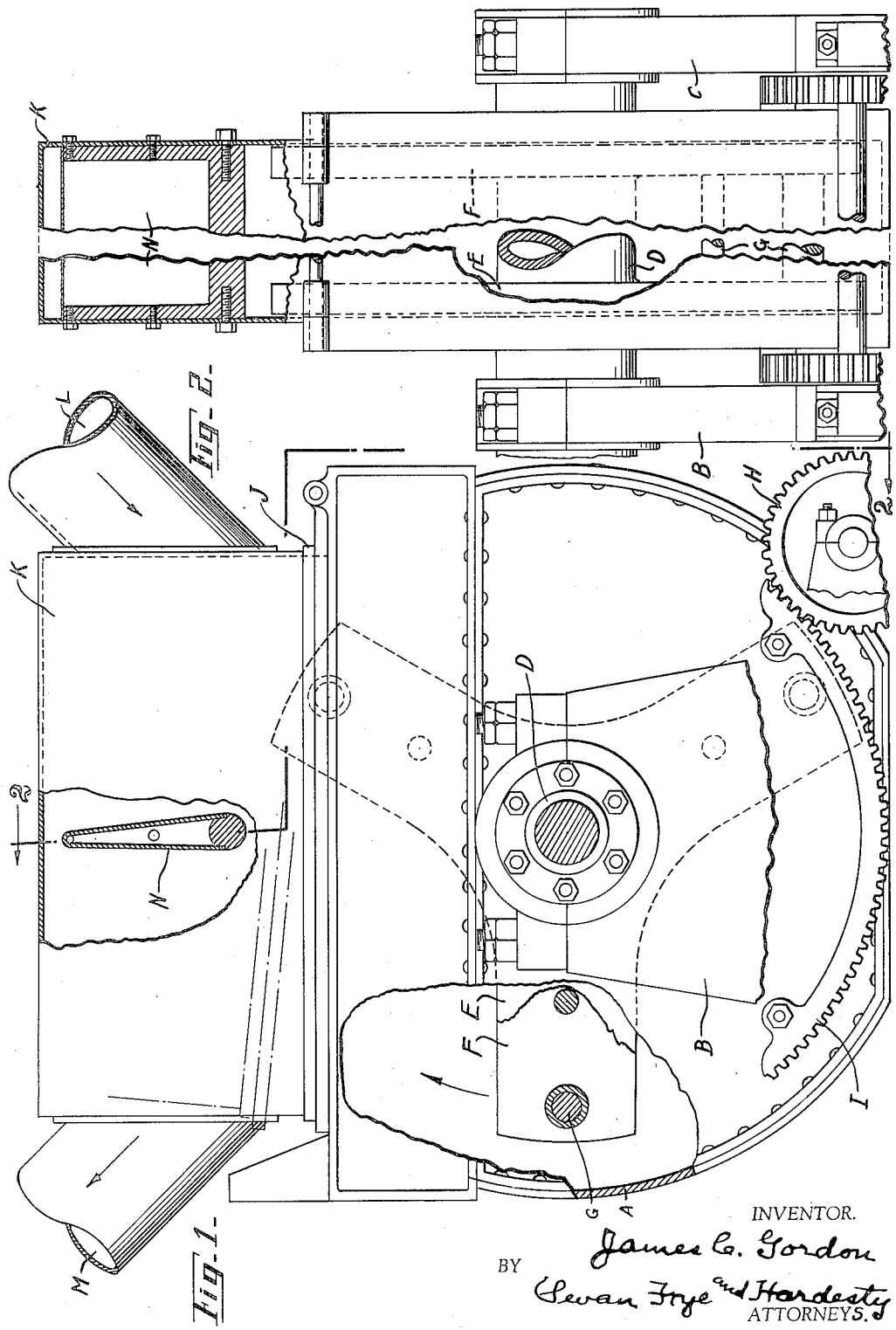

2,059,730

UNITED STATES PATENT OFFICE 2,059,730

DOUGH MIXING APPARATUS

James C. Gordon, Detroit, Mich., assignor to Gordon Baking Company, Detroit, Mich., a corporation of Michigan Application December 26, 1935, Serial No. 56,211

1 Claim. (Cl. 107—31)

This invention relates to dough-working apparatus of the type that is employed in large commercial bakeries, and has for its object an improved organization of parts by means of which a relatively large quantity of dough constituents may be commingled and worked upon at a single operation, the particular purpose of this apparatus being that stage of the handling and working of the dough wherein the expulsion from its mass of the gases generated by the action of the yeast is carried on.

This necessity for thorough ridding of the dough mass of this yeast-generated gas is by no means a matter of recent recognition, but in all previous apparatus of which I am aware, the steps taken to eliminate this trouble have been far from effective, whether it be the provision of a positive blast of fresh air into the dough mixing chamber, or the attempted withdrawal of gas laden air therefrom. And except after agitation of the dough has been effected by the action of the beating paddles or wheels, little attention has been paid to the matter of repeatedly breaking up the mass so that no residual pockets of gas may be left within the dough mass.

The elimination of these objectional features is efficiently accomplished by the apparatus shown in the accompanying drawing wherein Figure 1 is a side elevational view partly in section of my preferred form of apparatus, one of the cover plates being removed to facilitate the illustration of the interior parts.

Figure 2 is a compacted end elevational view showing the parts in their relative positions from this angle, but with the preferred breadth of the chamber and its contained wheel and other parts greatly abbreviated, as indicated by the broken center portion of the drawing.

A indicates a somewhat more than semi-cylindrical shell, and B and C the supporting frame therefor, only the frame B being visible in Figure 1. Supported by these frame pieces B and C is a shaft D of an agitating or paddle wheel E having as many branches as may be desired, three being here shown; and, as brought out in Figure 2, this wheel may be formed in two branches, one adjacent either side of the shell plates, as shown at E and F in Figure 2, while between them extend as many bars or cross pieces G as may be desired, to not only correlate the parts E and F, but as well, to permit some of the dough to flow past the agitating bars G as the wheel structure as a whole is rotated, the rotation being effected by any desired external power-transmitting means. At I is shown a ratcheted quadrant attached to the outside of the shell A, by means of which, under actuation from the intermeshing ratchet wheel H, the entire shell A may be tilted to effect the pouring out of the dough at the end of the agitating operation.

At the top of the shell or container A is located a hinged cover J, which may be raised when the introduction of a fresh supply of dough is desired, or when the removal of a kneaded lot is desired, or for cleansing the interior of the shell. Upon this cover piece J is supported a dome or upper shell piece K with one side of either of which is connected a fresh air inlet conduit as L, while from the other side there leads the exhaust passage M. Each of these conduits or passages is connected to appropriate mechanism for forcing the air in, and exerting a vacuum influence respectively, upon the interior of the apparatus.

For the sake of clearness I have illustrated the fresh air pipe L and the exhaust connection M as leading from the right-hand and the left hand ends respectively of the shell or container top K, as viewed in Figure 1. While this is entirely feasible, I find that spattering of the wet dough particles into the immediate ends of these passages can be lessened if not entirely avoided, by positioning these connections in the end walls of the top shell piece K, that is those which lie parallel to the plane of the sheet in Figure 1. Preferably, one of these connections as for example L, enters the back end wall of the shell K, while the passage M traverses the front end wall of the shell K or vice versa, so that, in either case their openings thereinto are as far removed as possible from the region of maximum splashing of the dough as agitated by the rotating wheel, which is greatest near the center of the shell as measured lengthwise of the shaft D.

About midway between the exhaust and inlet conduits is located a transverse baffle or partition N, whose lower end just clears the outer ends of the wheel arms E and F as the wheel and paddle mechanism just described is rotated.

Assuming that the wheel is rotated in the direction indicated by the arrow in the left centre portion of Figure 1, the dough, at this stage almost of the consistency of thin paste, is by the rotation of wheel and its connected paddle pieces, projected quite violently against this adjacent face of the baffle N, the centrifugal force to which it is responsive acting to splash the dough against practically all parts of the baffle, limited only by the over-engagement of the roof of the top shell piece K. Of course after being projected violently against the baffle the almost liquid dough keeps dripping off from the lower edge thereof and onto the parts of the wheel structure E and F once more for further agitation by it. But incident to its projection against the baffle its mass structure has been so shattered that the large number of relatively small pockets within which the objectional yeast generated gas can find lodgement are so repeatedly broken up that these particles are liberated in operative proximity to the end of the suction conduit M, and are largely drawn off accordingly.

Similarly, those particles which after being splashed against the baffle N are carried rotatably upward by the action of the wheel and paddle pieces are then brought over into the right-hand side of the structure as shown in Figure 1, where they are subjected to the action of the entering pure air furnished through the conduit L. Being carried further around by the action of the paddles the dough particles are then again projected against the left hand surface of the baffle N, as viewed in Figure 1, for effecting the further shattering of their mass and the release of gas particles which the first impact has not resulted in releasing, followed by a further exposure to the inwardly-forced pure air from the conduit L, continuingly, or until in the judgment of the baker the dough mass has been adequately worked upon.

It will thus be seen that by my directed arrangement of parts, including the position of the baffle intermediate the exhaust conduit M and the pure air conduit L, the repeated shattering or breaking up of the dough mass is accomplished in operative proximity to the exhaust pipe M, through which a large proportion of the gas elements are drawn away, followed by the dough's exposure at a definitely different position as regards the wheels' rotation, to the action of the pure air coming in through the conduit L. This cooperation and sequence of action thus results in adequately freeing the dough mass of the yeast-generated gas elements.

What I claim is:

A dough-mixing apparatus, comprising, in combination with a container provided with a top closure member through which material may be introduced into the container, a baffle member supported by said top closure member in vertical position over the central portion of the container, an air inlet connection positioned on one side of said baffle member, a suction connection leading from the upper portion of the container space on the opposite side of the baffle member from the location of said air inlet connection, and an agitating wheel rotatably positioned within the container subjacently of said baffle member and adapted to centrifugally project masses of the material being worked upon against one face of the baffle member, thereby effecting its repeated temporary disintegration in the line of air flow from the inlet to the outlet connections and the resultant release of gaseous particles from its mass for withdrawal through said suction connection.

JAMES C. GORDON.